United States Patent [19]

Mai et al.

[11] Patent Number: 4,839,187

[45] Date of Patent: Jun. 13, 1989

[54] ANTIOXIDANT COMPOSITIONS

[75] Inventors: Jimbin Mai, New Milford; Laura J. Chambers, New Preston; Richard E. McDonald, Brookfield, all of Conn.

[73] Assignee: Nestec S.A. Vevey, Switzerland

[21] Appl. No.: 65,616

[22] Filed: Jun. 30, 1987

Related U.S. Application Data

[63] Continuation of Ser. No. 620,754, Jun. 14, 1984, abandoned, which is a continuation-in-part of Ser. No. 561,678, Dec. 15, 1983, abandoned.

[51] Int. Cl.$^4$ ............................ A23B 4/14; A23L 3/34
[52] U.S. Cl. ..................................... 426/542; 426/435
[58] Field of Search ............... 426/541, 542, 543, 544, 426/545, 546, 547, 424, 429, 430, 435

[56] References Cited

U.S. PATENT DOCUMENTS

| | | | |
|---|---|---|---|
| 699,979 | 5/1902 | von Rom | 426/332 |
| 2,085,489 | 6/1937 | Baruth | 426/597 X |
| 2,354,719 | 8/1944 | Verbeck | 99/163 |
| 2,768,084 | 10/1956 | Griffith et al. | 426/541 X |
| 2,772,169 | 11/1956 | Hall | 426/541 |
| 3,108,877 | 10/1963 | Cooper | 426/435 X |
| 3,207,666 | 9/1965 | Houtgraaf et al. | 426/541 X |
| 3,451,823 | 6/1969 | Mishkin et al. | 426/541 X |
| 3,812,266 | 5/1974 | Sanderson et al. | 426/597 X |
| 3,950,553 | 4/1976 | Gasser et al. | 426/435 X |
| 4,004,038 | 1/1977 | Wickremasinghe | 426/597 X |

FOREIGN PATENT DOCUMENTS

| | | | |
|---|---|---|---|
| 688856 | 6/1964 | Canada | 426/435 |
| 1492754 | 11/1970 | Fed. Rep. of Germany | 426/435 |
| 2047861 | 3/1972 | Fed. Rep. of Germany | 426/435 |
| 46-39058 | 10/1971 | Japan . | |
| 857517 | 12/1960 | United Kingdom | 426/435 |
| 2085274 | 4/1982 | United Kingdom | 426/597 |

OTHER PUBLICATIONS

Lee, S., Tea and Coffee Trade Journal, May, 1960, pp. 22 and 68, 75 and 76.
Chem. Abstracts: 67:81289J; 73:33942U; 78:418700; 82:15397b; 85:191014V; 89:161807W; 82:153982Q; 89:128039Z;
Chakrabarty et al., "Utilization of Chemicals from Tea Waste as Antioxidants for fatty materials and their Nutritional Studies", *Fats Oils Relat. Food Prod. Their Prep. Symp.* 1976 (Publ. 1978) 112–16 CA:128039z (vol. 89).

*Primary Examiner*—Arthur L. Corbin
*Attorney, Agent, or Firm*—Vogt & O'Donnell

[57] ABSTRACT

A composition comprising a food susceptible to lipid oxidation and an extract formed by the aqueous extraction of black tea leaves in a process which includes extraction at a temperature from 120° to 210° C., the amount of extract being such that the content of tea solids present is from 0.005% to 1.5% by weight based on the weight of food.

10 Claims, No Drawings

ANTIOXIDANT COMPOSITIONS

This is a continuation application of co-pending application Ser. No. 620,754, filed June 4, 1984, now abandoned, which is a continuation-in-part of application Ser. No. 561,678, filed Dec. 15, 1983, which is also abandoned.

BACKGROUND OF THE INVENTION

The present invention relates to antioxidants for food substances, more particularly to antioxidants obtained by the extraction of tea leaves at temperatures of at least 120° C. as in certain processes for the production of instant tea.

Lipid autoxidation occurring in foods has always been a concern for both food processors and consumers and the most common method used to inhibit lipid oxidation is the application of synthetic antioxidants which block the oxidative reactions. However, owing to toxicological and nutritional considerations, only a very few synthetic antioxidants are permitted in food applications, e.g., butylhydroxytoluene (BHT), butylhydroxyanisole (BHA), propyl gallate (PG) and t-butyl hydroquinone (TBHQ). Even these antioxidants are now being examined by regulator agencies and consumer activists and these developments have urged the need to exploit new sources of natural antioxidants.

One natural product with excellent antioxidant properties, Rosemary AR, suffers from the disadvantage of having a very intensive characteristic herb flavour which may limit its use in some applications.

It is also reported in the literature that certain tea extracts have antioxidant properties, e.g., extracts of tea leaves, tea grounds, tea sweepings and tea wastes, but in all the tea extracts so far described, the antioxidant activity is generally very low and the application of each extract is limited to a restricted class of food materials. As far as we are aware no study on the antioxidant properties of instant tea or the intermediate extracts produced during its manufacture has been documented.

SUMMARY OF THE INVENTION

We have found surprisingly, that in the aqueous extractions of black tea leaves at temperatures from 120° C. to 210° C., certain extracts are formed which contain appreciable quantities of gallic acid. These extracts have an antioxidant activity comparable with or superior to synthetic antioxidant systems, and they do not suffer from the intensive flavour problem of Rosemary AR. In addition, these extracts are effective in a much wider variety of food systems than tea extracts previously described as having antioxidant activity. Unlike conventional antioxidants, they are both oil and water soluble and this property is especially advantageous when the food systems are oil-in-water emulsions and water-in-oil emulsions. Still further, we have also found that these extracts, by soaking uncooked roast beef overnight in a tea extract solution of about 0.25% by weight, are useful in inhibiting the "warmed-over" flavor commonly associated with cooked roast beef which has been reheated.

Accordingly, the present invention provides a composition comprising a food susceptible to lipid oxidation and an extract formed by the aqueous extraction of black tea leaves in a process which includes a treatment at a temperature from 1210° C. to 210° C., the amount of extract being such that the content of tea solids present is from 0.005% to 1.5% by weight based on the weight of food, said extract containing at least 5% by weight of phenol compounds based on the weight of tea solids.

Food materials that may be stabilized against oxidation are, for example, frying oils and fats, potato flakes, bakery products, meat emulsions, precooked cereals, instant noodles, soybean milk, chicken products, emulsion products such as sausage, mayonnaise and margarine, frozen fish, frozen pizza, cheese and animal foods.

Instant tea is routinely prepared by the hot water extraction of tea leaves, for example, as described in *World Coffee and Tea*, April 1972, pages 54–57, "The practice of instant tea manufacture". In the present invention, similar extraction conditions used in instant tea manufacture are followed wherein at least part of the extraction of the tea leaves is carried out at a temperature of at least 120° C. to obtain the tea extracts with valuable antioxidant properties. Those extracts as well as the spent tea leaves or residues remaining after extraction, and the instant tea powder have antioxidant properties. For convenience, the word "extract" used in this invention includes the instant tea powder, the spent tea leaves and residues, including tea grounds, tea sweepings and tea wastes, after extraction. The concentrated extracts containing up to 15% tea solids, especially from 4% to 105 tea solids have especially good antioxidant activity.

DESCRIPTION OF PREFERRED EMBODIMENTS

In one particular process of making tea antioxidant, black tea leaves are extracted at a temperature from 80° C. to 130° C. to give an initial extract (Fraction I). The residual leaves are extracted at a temperature from 120° C. to 210° C. and centrifuged to give a second extract (Fraction II). Fraction I and Fraction Ii are combined and concentrated to give an approximately 5–10% tea concentrate which is cooled and the insoluble tannins separated therefrom to give a water soluble tea liquor (Fraction III). All fractions are further concentrated and dried. Preferably the tea leaves are extracted at a temperature from 100° C. to 125° C. and especially from 105° C. to 120° C., for a period from 10 minutes to 60 minutes to give the initial extract. The residual tea leaves are then milled, slurried and extracted again conveniently for a period from 5 to 60 minutes, preferably from 20 to 40 minutes, at a temperature from 130° C. to 210° C., preferably from 145° C. to 195° C., more preferably from 160° C. to 185° C., and especially from 165° C. to 180° C. Advantageously, the extraction at the higher temperatures is carried out under pressure, the preferred pressures used ranging from 1 bar at 130° C. to 15 bars at 210° C. After this second extraction the tea residue is removed by centrifugation to yield Fraction II. In this process, Fraction I, Fraction II, Fraction III, the residual tea leaves and the ultimately produced instant tea all have significant antioxidant activity, and especially Fraction II and Fraction III.

In particular, appreciable antioxidant activity is possessed by the various extracts, the residual tea leaves and also the instant tea produced in the processes described in U.S. Pat. No. 3,451,823.

Excellent antioxidant activity is obtained when the amount of phenol compounds is at least 5% by weight and preferably at least 8% by weight based on the weight of tea solids.

The major phenolic constituents of the tea solids and the amount of each usually present in the extracts are gallic acid (0.05 to 1.5%), epicatechnin (0.01 to 0.5%), catechin (0.01 to 0.6%), epigallocatechin (0.01 to 0.75), epicatechin gallate (0.01 to 1.00%) and epigallocatechin gallate (0.01 to 1.5%), all the amounts being given as percentages by weight based on the weight of tea solids. The amount of extract present in the food is conveniently such that the tea solids content is from 0.008 to 1.00% by weight, preferably from 0.02 to 0.75% and especially from 0.05 to 0.5% by weight based on the weight of food. The tea extracts show antioxidative synergism in food either with ascorbic acid or with lecithin. The amount of ascorbic acid or lecithin used in a synergistic mixture may be from 0.02 to 2.00%, preferably from 0.05 to 1.00% by weight based on the weight of food, while the amount of extract is conveniently such that the solids content is from 0.01 to 0.5% by weight based on the weight of food.

In a preferred embodiment of the present invention, the tea extracts may be further extracted with a water-immiscible organic solvent capable of extracting at least a part of the phenol compounds from the extracts, for example, by partitioning. Examples of such solvents are petroleum ether, pentane, diethyl ether, hexane, ethyl propionate, ethyl acetate, methyl iso-butyl ketone or halogenated hydrocarbons such as Freons. The extracted polyphenols may then be separated, for example, by removal of the solvent by rotary evaporation, and reconstituted with water and freeze-dried. Such phenolic-containing extracts have superior antioxidant activity and oil solubility to the tea extracts from which they are extracted.

In another embodiment of this invention, the Fraction I extract may be heated at a temperature from 130° C. to 210° C., preferably from 160° C. to 210° C., for a period of, for instance, 10 to 60 minutes to give an extract with improved antioxidative effectiveness.

In yet another embodiment of the present invention, the tea extracts may be treated with tannase to increase the antioxidant activity. The treatment with tannase is preferably carried out at a pH from 4.0 to 5.5, especially from 4.5 to 5.0. The amount of the tannase used to treat the tea extract is not critical but usually an amount from 0.02% to 1.0% by weight based on the weight of tea solids is effective and conveniently an amount from 0.05% to 0.5% by weight based on the weight of tea extract may be used. The synergistic antioxidant effect with ascorbic acid is especially marked when the tea extracts are treated with tannase, especially at low levels of application, e.g., 0.02% to 0.05% by weight of solids based on the weight of food.

EXAMPLES

The following examples further illustrate the present invention.

Example 1

Black tea leaves are extracted at a temperature between 110° C. and 120° C. for 30 minutes to give Fraction I. The residual tea leaves are milled, slurried and then extracted at 190° C. and a pressure of 11 bars for a further 30 minutes. This slurry was centrifuged and the supernatant was recovered as Fraction II. A combination of Fraction I and Fraction II was then concentrated to give a 5–10% tea concentrate which was cooled to a temperature of 15° C. to precipitate the insoluble tannins. The tea liquor was then centrifuged and the insoluble tannins removed to give Fraction III.

Samples of Fraction II and Fraction III, respectively, were incorporated into separate 100g batches of chicken fat in amounts such that the content of tea solids in each batch was 0.05% by weight based on the weight of the chicken fat. In addition, a mixture of Fraction II and ascorbic acid (AA) was incorporated into a further 100g batch of chicken fat wherein the amount of Fraction II was such that the content of tea solids in the batch was 0.10% by weight based on the weight of chicken fat and the amount of ascorbic acid was 0.05% by weight based on the weight of chicken fat. As a comparison 0.01g of BHA was incorporated in a further 100g batch of chicken fat. The antioxidative activity was determined by a modified Rancimat Method which is an accelerated oxidation test described by J. Frank, J. Geil and R. Freaso in "Food Technology 1982, Vol. 36, No. 6, p. 71", in chicken fat at 100° C. The oxidative stability of the chicken fat was determined by the induction period (IP), the time required for the fat to become rancid. To facilitate comparison of the data, the antioxidant index (AI), defined as the induction period of the treatment divided by the induction period of the control was used to report the effectiveness of the antioxidants. In the test, frozen chicken fat was melted directly over low heat on a stove top. The test antioxidants were incorporated directly into 100g samples of the melted fat and homogenised. Ten gram samples of the control chicken fat, and chicken fat containing the antioxidant were then placed in the Rancimat reaction vessels for the accelerated oxidation test. The test temperature was 110° C. instead of 100° C. which is prescribed by the Rancimat Method noted above. This was the only modification made to the Rancimat procedure. The air flow rate was 20 liter hr. The results are as shown in Table I:

TABLE I

| ANTIOXIDANT | AI |
| --- | --- |
| Fraction II | 3.6 |
| Fraction III | 5.0 |
| Fraction II and AA | 6.4 |
| BHA | 6.0 |

These results showed that the antioxidant activity of the tea extracts were comparable with that of a commercial synthetic antioxidant.

Example 2

Samples of Fraction I, Fraction II, residual tea leaves and Fraction III formed in the process described in Example 1 were incorporated into chicken fat at various concentrations and tested in exactly the same way as described in Example 1. The values of the antioxidant activity (AI) at the various concentrations given as the % content of tea solids present in the chicken fat are shown in Table II:

TABLE II

| | Tea Solids (% Concentration) | | | |
| --- | --- | --- | --- | --- |
| Antioxidant | 0.05 | 0.10 | 0.50 | 1.0 |
| Fraction I | 1.5 | 1.8 | 3.4 | — |
| Fraction II | 3.6 | 6.2 | 13.2 | 15.6 |
| Residual Tea Leaves | 1.0 | 1.6 | 3.0 | 2.8 |
| Fraction III | 5.0 | 8.0 | 18.0 | 21.7 |
| Instant Tea Powder | 1.8 | 2.2 | 4.6 | 7.3 |

No flavour from the tea extracts was imparted to the chicken fat even at 1% concentration.

Example 3

Individual samples of Fraction II formed in the process described in Example 1, soy lecithin and mixtures thereof were incorporated into chicken fat at the concentrations indicated in Table III and tested in exactly the same way as described in Example I. The induction period of the chicken fat without additives, the induction period of the chicken fat containing the specified additives, as well as the % synergism of the mixtures of Fraction II and soy lecithin are indicated in Table III.

TABLE III

| Sample | Induction period (hr) | % synergism |
|---|---|---|
| Control | 1.0 | — |
| Fraction II, 500 ppm | 3.0 | — |
| Lecithin*, 500 ppm | 1.2 | — |
| Fraction II, 500 ppm and lecithin, 500 ppm | 4.3 | 33.3 |
| Lecithin, 1000 ppm | 1.4 | — |
| Fraction II, 500 ppm and lecithin, 1000 ppm | 4.9 | 38.5 |

*Centrolex f lecithin, Central Soya $$\% \text{ synergism} = \frac{100\,[(IM - IL) - (IA - IL) - (IS - IL)]}{(IM - IL)}$$

IL = Induction period of substrate
IA = Induction period of primary antioxidant
IS = Induction period of synergist
IM = Induction period of primary antioxidant/synergist

Example 4

Samples of Fraction I and Fraction II formed in the process described in Example 1 were each made into 3% aqueous solutions. To each solution were added two volumes of ethyl acetate to form two immiscible layers. The organic layer was collected and the procedure of extraction was repeated twice. The pooled organic layer was rotary evaporated and the residue freeze dried. The yield was 31% for Fraction I and 9% for Fraction II.

Samples of Fraction I, Fraction II, the organic solvent of Fraction I (Fraction IA) and the organic extract of Fraction II (Fraction IIA) were incorporated into chicken fat at a solids content of 500 ppm and the antioxidant index (AI) was determined as described in Example 1. The results are given in Table IV and illustrate the improved antioxidant activity of the organic extract compared with the aqueous extract.

TABLE IV

| Instant Tea Extract | AI |
|---|---|
| Fraction I | 2.1 |
| Fraction II | 3.8 |
| Fraction IA | 7.8 |
| Fraction IIA | 11.6 |

Example 5

A sample of Fraction I formed in the process described in Example I was heated at 190° C. for 30 minutes. Samples of Fraction I and the treated Fraction I were incorporated into chicken fat at a solids content of 500 ppm and the antioxidant index measured in the way described in Example 1 was found to be 2.4 for Fraction I and 4.1 for treated Fraction I, an improvement of 70%.

Example 6

A sample of Fraction I formed in the process described in Example 1 was mixed for 1 hour at 45° C. and at pH 4.5 with 0.1% by weight based on the weight of Fraction I of tannase obtained from Enzyme Development Company, NY, NY. Samples of Fraction I and the tannase treated Fraction I were incorporated into chicken fat at a solids content of 500 ppm and the antioxidant index measured in the way described in Example 1 was found to be 1.5 for Fraction I and 2.8 for the tannase treated Fraction I showing that the tannase treatment almost doubled the antioxidant activity of Fraction I.

Example 7

Samples of Fraction I formed in the process described in Example 1, Fraction I treated with tannase as described in Example 6, and a mixture of 85 parts of a tannase treated Fraction I and 15 parts of ascorbic acid were incorporated into separate samples of chicken fat at a solids content concentration indicated in Table V. The antioxidant index (AI) of each sample was measured in the way described in Example 1 and the values of the AI at the various concentrations are shown in Table V.

TABLE V

| Antioxidant | Tea solids (% concentration in chicken fat) | | | | |
|---|---|---|---|---|---|
| | 0.025 | 0.05 | 0.10 | 0.25 | 0.50 |
| Fraction I | 1.2 | 1.4 | 1.8 | 2.7 | 3.4 |
| Tannase treated Fraction I | 1.6 | 2.5 | 3.4 | 4.6 | 4.7 |
| Tannase treated Fraction I + Ascorbic acid | 3.5 | 4.5 | 4.8 | 5.8 | 7.1 |

These results show that there is excellent synergism between tannase treated Fraction I and ascorbic acid, especially at solids concentrations of 0.025% and 0.05%.

Example 8

The effectiveness of Fraction II and solvent extracted Fraction II as prepared in Example 4 of the present invention was tested in pork by mixing each extract at a solids concentration shown in Table VI with 1000g portions of fresh ground pork in a Hobart Mixer (Model Nr. K5-A) on a setting of 2 for 3 minutes. Fraction II was added to 20ml water before being mixed with the pork whereas solvent extracted Fraction II was mixed with 2.5ml ethanol and then incorporated into 20ml water to aid dispersion. The tea antioxidants of the present invention were compared with the fat soluble antioxidants Rosemary AR and a mixture of BHA and BHT which were also mixed with 2.5ml ethanol and then incorporated into 20ml water before adding to the pork. 25g portions of each batch of pork containing the antioxidants as well as a 25g portion of fresh ground pork not containing any added antioxidants were packed in air-permeable plastic films and stored for one week at 4° C. The antioxidant effectiveness was evaluated by a sensor evaluation panel and the results are shown in Table VI.

TABLE VI

| TREATMENT | Rank | Comments |
|---|---|---|
| Control (no additives) | 5 | Spoiled, rancid |
| Fraction II (1000 ppm) | 2 | Fresh meat aroma |
| Solvent extract (500 ppm) | 1 | Fresh meat aroma |
| Rosemary AR (500 ppm) | 4 | Rosemary odour |
| BHA (100 ppm) & BHT (100 ppm) | 3 | Slight off-odour |

Example 9

The effectiveness of a solvent extracted Fraction II as prepared in Example 4 of the present invention was tested in both pork and beef at a solids concentration of 250 ppm in 100g portions of fresh ground pork and beef. The solvent extracted Fraction II was mixed with 2.5ml ethanol and then incorporated into 20ml water before being mixed with the meat in a Hobart Mixer (Model Nr. K5-A) on a setting of 2 for 3 minutes. 25g portions of each batch of pork and beef containing solvent extract as well as 25g control portions of pork and beef not containing any added antioxidants were packed in airpermeable plastic films and stored for 8 days at 4° C. The antioxidant effectiveness was evaluated by the chemical TBA (thiobarbituric acid) method following as general guideline, the procedure of Tarladgis et al. 1960. J. Am. Oil Chem. Soc. 37:44. The results given in Table VII show clearly the superior antioxidant activity of the solvent extracts of the present invention.

TABLE VII

| SAMPLE | TBA Value* |
|---|---|
| Pork Control | 0.44 |
| Pork + Solvent Extract | 0.22 |
| Beef Control | 1.27 |
| Beef + Solvent Extract | 0.38 |

*mg malonaldehyde per 1000 g sample.

We claim:

1. A composition comprising a food susceptible to lipid oxidation and a black tea extract containing 0.005% to 1.5% tea solids based upon the weight of the food, wherein the extract has been obtained by aqueous extraction of black tea at a temperature of from 130° C. to 210° C. and is selected from the group consisting of aqueous extracts, spent tea leaves, residues from the extraction of the black tea, and instant tea powder and combinations thereof.

2. A composition according to claim 1 wherein the black tea is extracted for a period of from 10 minutes to 60 minutes.

3. A composition as claimed in claim 1 wherein the tea solids contain phenol compounds in an amount of at least 5% by weight based upon the weight of the tea solids.

4. A composition according to claim 1 or 3 wherein the extract has been treated with tannase.

5. A composition according to claim 4 further comprising a material selected from the group consisting of ascorbic acid and lecithin and combinations thereof.

6. A composition according to claim 1 or 3 further comprising a material selected from the group consisting of ascorbic acid and lecithin and combinations thereof.

7. A composition according to claim 1 or 3 wherein precipitated tannins are removed from the extract.

8. A composition according to claim 1 or 3 wherein said food susceptible to lipid oxidation is a food selected from the group consisting of frying oils, frying fats, potato flakes, bakery products, meat emulsions, precooked cereals, instant noodles, soybean milk, chicken products, sausage, mayonnaise, margarine, frozen fish, frozen pizza, cheese, pork and beef.

9. A composition according to claim 1 wherein the extract has been obtained at a temperature of from 145° C. to 195° C.

10. A composition according to claim 1 wherein the extract has been obtained at a temperature of from 160° C. to 185° C.

* * * * *